United States Patent [19]

Bernstein et al.

[11] Patent Number: 4,878,193

[45] Date of Patent: Oct. 31, 1989

[54] METHOD AND APPARATUS FOR ACCELERATED ADDITION OF SLICED ADDENDS

[75] Inventors: Debra Bernstein, Sudbury; James B. Keller, Arlington, both of Mass.

[73] Assignee: Digital Equipment Corporation, Maynard, Mass.

[21] Appl. No.: 176,594

[22] Filed: Apr. 1, 1988

[51] Int. Cl.⁴ .............................................. G06F 7/50
[52] U.S. Cl. .................................................. 364/768
[58] Field of Search ........................ 364/768, 749, 736

[56] References Cited

U.S. PATENT DOCUMENTS 3,789,957 12/1988 Nichaus et al. ..................... 364/749
3,900,723  8/1975 Bethany et al. ..................... 364/736
4,525,796  6/1985 Omoda et al. ...................... 364/736

Primary Examiner—David H. Malzahn
Attorney, Agent, or Firm—Kenyon & Kenyon

[57] ABSTRACT

The invention is directed to a method and circuit for performing an addition operation in successive pipelined instructions which utilize a sliced ALU. Successive microinstructions are monitored to determine if both microinstructions are add operations. Further, it is determined whether the use of the destination of the first microinstruction is a source for the add operation in the second microinstruction. If both microinstructions are add operations and the destination of the first microinstruction is used as the source for the second microinstruction and one of the addends of the second microinstruction is a small addend then the circuit detects whether a carry-out occurred in the least significant slice of the second instruction. If there is no carry-out, the result for the more significant slice of the second microinstruction answer. However, if a carry-out was detected, then the result for the second microinstruction's more significant slice is the sum+1 of the second microinstruction.

4 Claims, 2 Drawing Sheets

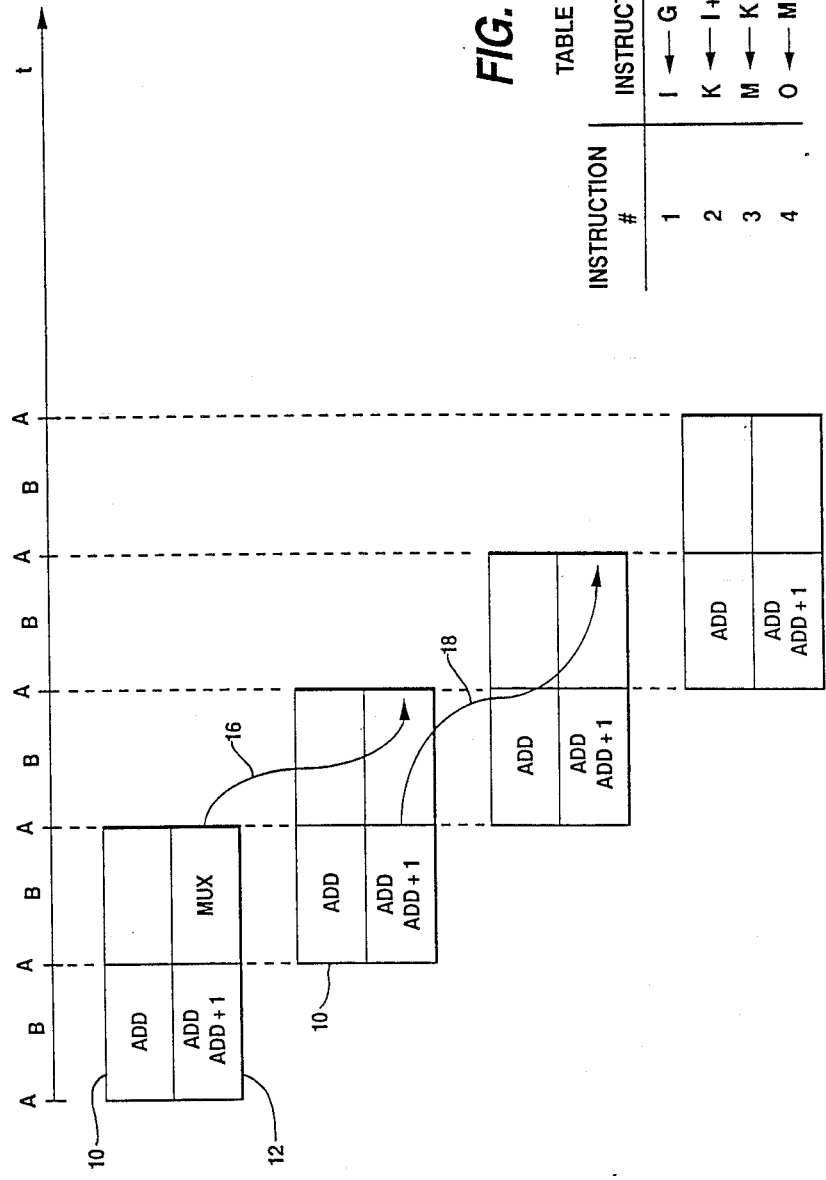

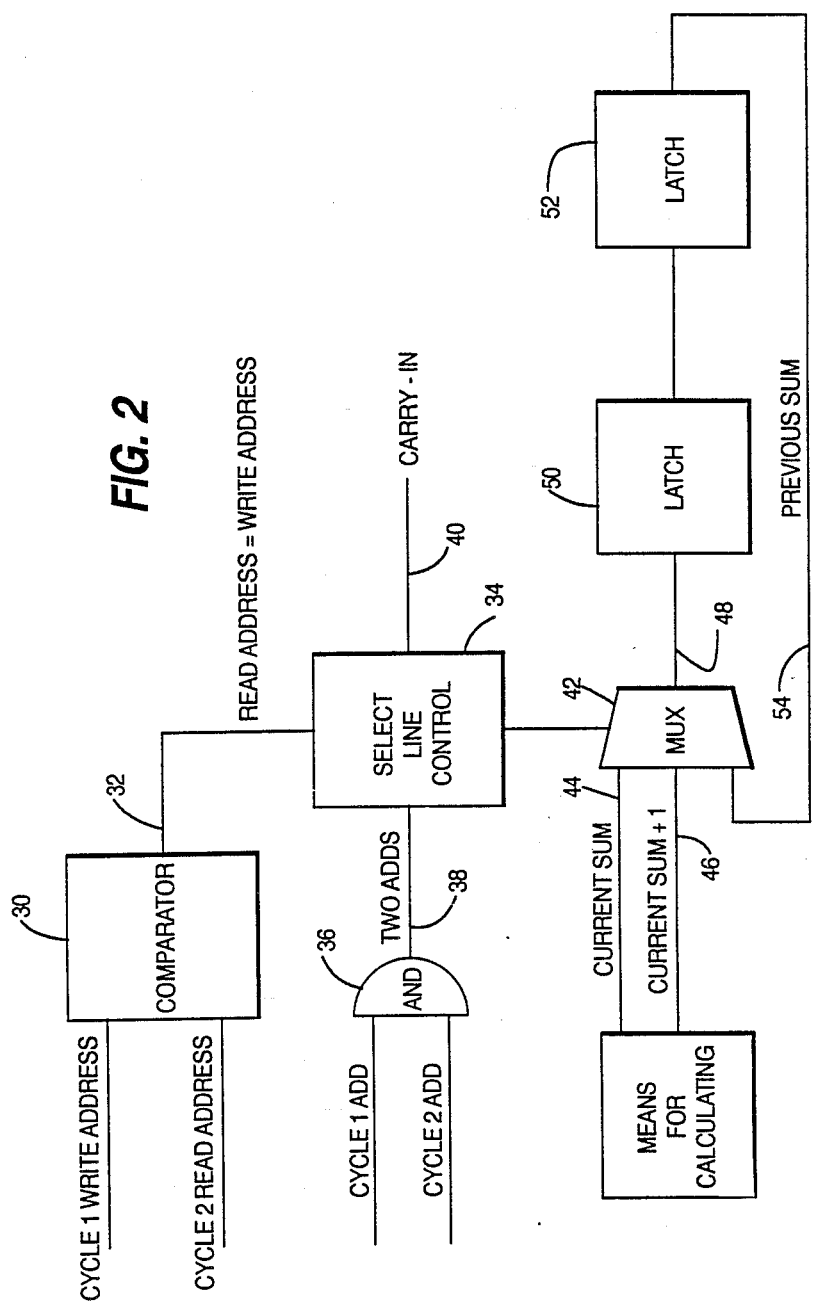

METHOD AND APPARATUS FOR ACCELERATED ADDITION OF SLICED ADDENDS

FIELD OF THE INVENTION

This invention relates to the processor field in general and, more particularly, to a logic circuit for accelerating addition in a sliced arithmetic logic unit (ALU).

BACKGROUND OF THE INVENTION

In many sliced designs for an ALU, pipelining is used to improve performance. For example, in a two slice design, wherein each addend is sliced into a most significant slice and a least significant slice, an add operation can be performed in two cycles. In the first cycle, partial results are calculated for each slice of the addends. A sum and a carry-out are calculated for the least significant slice. For the most significant slice a partial sum and a partial sum+1 are calculated. These partial sums are produced both for carry-in and no-carry-in situations, i.e. the most significant slice partial sum is used when there is no-carry-in from the least significant slice and the partial sum+1 is used when there is a carry-in from the least significant slice. Likewise, a carry generate signal is produced and sent to the upper slice to indicate whether there is a carry-in. In the second cycle, the carry generate signal crosses the ALU from chip to chip to produce a carry-in signal to the most significant slice add operation. The carry-in signal selects which partial result from the previous cycle's most significant slice is to be output. Thus, the entire answer is complete in two cycles. Since the operations first performed in the two cycles are independant, the ALU can be pipelined. Although the addition takes 2 cycles, a new result is produced every cycle. However, for the most significant slice, this pipeline efficiency is lost whenever the result of one add operation is needed as an input to the next add operation.

Prior solutions involved the insertion of a no operation (NOP) instruction or an ALU operation on different data between the successive adds to delay the add until the previous result is available. However, there is often no useful work to be done in this period and therefore the cycle is wasted.

SUMMARY OF THE INVENTION

It is often desirable to perform one or more adds in succession and to use the results immediately in the next cycle. It has been observed that, often, successive adds are only adding small increments. A common instance is reading or writing sequential longwords of memory, for example, to perform stack operations, character string instructions, etc. In performing these small adds, it is true that the most significant slice partial sum is equal to the most significant slice input since the most significant slice of a small addend is zero. Further, the most significant partial sum+1 is equal to the most significant input+1. The least significant slice result is always calculated in one cycle. As a result, it is only necessary to be able to calculate the most significant slice result in one cycle in order to achieve successive adds every cycle without delay.

The present invention includes logic hardware in the more significant slice adders to take advantage of successive small add situations, i.e. when the more significant slices of one of the addends of successive add operations is equal to zero. The hardware remembers the sum from the previous cycle. Further, the hardware recognizes that both the current cycle and the previous cycle are add operations and that the partial sum from the previous cycle is being used as the input to the current add cycle.

When the above situation is detected, the hardware in the more significant slices implements the rule that the previous more significant slice sum is used as the more significant slice answer for the current add. However, if a carry-out is detected by the hardware, then the current partial sum+1 is used as the answer for the current add. The only restriction that must be adhered to is that there can never be more than one carry-out in a string of successive adds.

BRIEF DESCRIPTION OF THE DRAWINGS

FIG. 1 is a waterfall chart for the adder part of a series of pipelined microinstructions.

FIG. 1A is a table of microinstructions corresponding to the waterfall chart of FIG. 1.

FIG. 2 is a block diagram of a preferred hardware logic circuit of the present invention.

DETAILED DESCRIPTION

A fast add logic circuit is included in each arithmetic logic unit (ALU) more significant slice to correctly and expeditiously handle successive adds which meet the conditions outlined below. It should be noted that the invention is described with respect to a two slice design for clarity of explanation. However, the invention can be implanted in slice designs wherein the number of slices is greater than two.

First, the added amount must be less than or equal to the size of the least significant slice. However, the added amount may change from cycle to cycle.

Second, the ALU's destination for the "$n^{th}$" microinstruction must be used as the source for "$(n+1)^{th}$" microinstruction. This requirement assures that the adds are successive and that the previous answer is needed for computing the following microinstruction add. Finally, the microcode must be restricted such that the add sequence produces at most one carry-out from the least significant slice. Adds which violate any of the above conditions must wait the full two cycles for their results.

Referring to FIG. 1, there is shown a portion of a timing chart for a sequence of microinstructions. Such a chart is known as a waterfall chart. The waterfall chart of FIG. 1 only shows the adder piece in a series of pipelined microinstructions 1-4. Each microinstruction 1-4 is divided into two slices. The least significant slices 10 perform an add operation on the least significant bytes. The least significant slice also signals when a carry-out occurs in the add operation. The most significant slices 12 perform both a "sum+0" and a "sum+1" operation.

Each clock cycle has both an A phase and a B phase. The A and B phases of the clock are indicated on the time line "t". FIG. 1 illustrates four microinstructions (5 clock cycles) of the ALU pipeline.

Referring to FIG. 1A, a table of microinstructions is shown corresponding to the four microinstructions of FIG. 1. Also given in the table is an example of a series of additions associated with the microinstructions corresponding to the data in FIG. 1.

The operation of the fast adder using the example given in FIGS. 1 and 1A is now described. The first microinstruction 1 adds the values of G and H and places the result in I. In the example, hexadecimal numbers "AB+01" are added to produce "AC". This is shown in FIG. 1 where the least significant slice 10 adds the least significant bits "B+1" to obtain the sum "C" in the first clock cycle. The second clock cycle passes the result of the least significant sum.

The most significant slice 12 adds the most significant bits "A+0" to produce the partial sum "A". However, because a carry-in might occur from the least significant slice, the most significant slice also performs a sum+1 add operation which produces a partial sum+1 equaling "B". The second clock cycle uses a multiplexer (MUX) to choose either the "sum" or "sum+1" depending upon whether a carry-in occurred.

In essence, the least significant slice 10 calculates a sum and the carry out in the first cycle of the add. The most significant slice 12 calculates the partial sum and partial sum+1 in the first cycle. In the second cycle, the carry-out crosses from chip to chip and is used to select between the results calculated in the most significant slice 12. Thus, the entire answer is completed in two clock cycles.

Continuing, the next microinstruction 2 adds the values of "I" and "J" and places the result in "K". However, because the instructions are pipelined, the second microinstruction 2 begins 1 cycle after the previous microinstruction 1. Thus, the value of "I" has not yet been produced and therefore cannot be used as an input to the second microinstruction 2. In heretofore known systems, a mechanism such as the insertion of a NOP instruction is used to delay the second add until the first add has completed. However, this slows down the efficiency of the pipeline as the result of a second successive add must wait an additional clock cycle to be computed.

The present invention eliminates the delay when the successive adds are of small increments. In small adds, the most significant partial sum is equal to the most significant input because the most significant slice of the "small increment" addend is zero. Further, the most significant partial sum+1 is equal to the most significant input +1. Also, the least significant result is always calculated in one cycle.

The fast add circuitry in the most significant slice makes use of these facts to increase the efficiency of successive small adds. The fast add circuitry detects that the current and previous cycle are both add operations and that the result from the previous add operation is to be used as an input to the current cycle add. When these conditions occur, the fast adder operates by using the previous sum as the result of the current most significant slice add. The sole exception is that when a carry-out occurs in the least significant slice, then the current partial sum+1 is used as the result for the most significant slice.

Referring again to the example, if microinstruction 2 adds hexadecimal numbers "AC+02" to produce "AE", the fast add circuity would be implemented. In this case, the least significant slice 10 would add normally to produce "E". However the most significant slice would implement the fast add method and select the previous result as shown by line 16 for the answer to the second microinstruction. The value "A" was the previous most significant slice result and, therefore, the answer for microinstruction 2 is "AE".

Continuing to the third microinstruction 3, which adds the value of the previous result to the value of "L" and produces an output "M", the fast add circuity is still in operation. Assuming that the value of "L" is hexadecimal number "02" such that a carry-out will occur in the least significant slice, the fast add method selects the previous most significant partial sum+1 on line 18 as the most significant slice answer. By normally the least significant slice add and using the sum+1 result, the add operation of microinstruction 3 produces the correct answer "B1".

Microinstruction 4 extends the example to another carry-less add. Using the fast add method, the most significant slice would use the most significant result from micro-instruction 3. Thus the current sum B3, as shown on line 20, would be calculated. The fast add logic is dependent upon there never being more than one carry-out in a string of a successive adds. If a second carry-out occurs then the addition must wait a cycle for a new most significant partial sum and partial sum+1 to be generated.

FIG. 2 shows a block diagram of a preferred embodiment of the fast add logic hardware. A comparator 30 compares the previous cycle write address with the current cycle read address. If the read address equals the write address then a signal is output on a line 32 coupling the comparator 30 to an add mux select line control 34. An and gate 36 determines whether the previous microinstruction and the current microinstruction are both add instructions. If they are both adds then a signal is output on line 38 to the add mux select line control 34. Line 40 coupled to the add mux select line control indicates whether a carry has occurred in the least significant slice.

The add mux select line control 34 controls a multiplexer 42 which outputs the result of the most significant slice. Mux 42 has as its inputs the partial current sum on line 44 and the partial current sum+1 on line 46 from the ALU adder. The output on line 48 of the mux 42 is fed through latches 50 and 52. A feedback path 54 is coupled from latch 52 to the input of mux 42. This allows the add mux select line control 34 to select either the previous result or the partial current sum+1 as the output for the most significant slice. Selection is determined in accordance with the method illustrated in the above example. Therefore, the fast add logic hardware allows efficient use of the pipeline in the processing of successive small adds.

What is claimed is:

1. A method for performing an addition operation on sliced addends in successive pipelined microinstructions, the addends having at least a more significant slice and a least significant slice, where the more significant slice in one of the addends in successive microinstructions is a zero in each said successive microinstruction, the method comprising the steps of:

(a) monitoring first and second successive pipelined microinstructions in successive clock cycles to determine if both microinstructions are add operations;

(b) detecting use of a destination of the first microinstruction as a source for the add operation of the second microinstruction;

(c) requiring the more significant slice in at least one of the addends to be a zero in each said successive microinstruction;

(d) performing said addition operations in each of said slices in said first microinstruction to calculate more and least significant slice sums and a more significant slice sum plus one;

(f) upon a dermination that both microinstructions are add operations, and the detection of the use of the destination of the first microinstruction as a source for the add operation of the second microinstruction, pursuant to steps (a) and (b);
  (i) selecting the more significant slice sum of the first microinstruction to be the more significant slice sum of said second microinstruction when said carry-out is not detected; and
  (ii) selecting the more significant slice sum plus one to be the more significant slice sum of the second microinstruction when said carry-out is detected.

2. The method of claim 1 wherein the sliced addends are each sliced into a most significant slice and a least significant slice.

3. An apparatus for performing an addition operation in a computer on sliced addends in successive microinstructions, the addends having at least a more significant slice and a least significant slice, where a more significant slice in one of the addends in successive microinstructions is a zero, said apparatus comprising:

means for calculating a more significant slice sum, a more significant slice sum+1, and a least significant slice sum of addends of an addition operation in a successive microinstruction;

a multiplexer controlled by control signals on a select line, receiving as inputs from said means for calculating the more significant slice sum and the more significant slice sum+1, and having an output connected to an input of said multiplexer;

a logic gate with an output connected to said select line for outputting a first control signal when:
  (i) said least significant slice sum has a carry-out;
  (ii) first and second successive microinstructions in successive clock cycles are both add operations; and
  (iii) a destination of the first microinstruction is a source for the addition operation of the second microinstruction;
and outputting a second control signal when any of conditions (ii) or (iii) are not met;

wherein said multiplexer outputs: the more significant slice sum+1 when the first control signal is outputted; and the more significant slice sum when the second control signal is outputted.

4. An apparatus according to claim 3 wherein said multiplexer outputs the previous sum when condition (i) is not met.

* * * * *

UNITED STATES PATENT AND TRADEMARK OFFICE
CERTIFICATE OF CORRECTION

PATENT NO. : 4,878,193
DATED : October 31, 1989
INVENTOR(S) : Debra Bernstein et al It is certified that error appears in the above-indentified patent and that said Letters Patent is hereby corrected as shown below:

Column 4, line 68, please add the following paragraph --e)detecting whether a carry-out occurred in the least significant slice sum of the first microinstruction; --.

Signed and Sealed this

First Day of March, 1994

Attest:

BRUCE LEHMAN

Attesting Officer

Commissioner of Patents and Trademarks